(12) United States Patent
Brown et al.

(10) Patent No.: US 6,306,981 B1
(45) Date of Patent: Oct. 23, 2001

(54) GAS PHASE POLYMERIZATION PROCESS

(75) Inventors: Robert Cecil Brown, Danbury; Norman Louis Balmer, Ridgefield, both of CT (US); Larry Lee Simpson, Hurricane, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/285,514

(22) Filed: Apr. 2, 1999

(51) Int. Cl.$^7$ ..................................................... C08F 2/34
(52) U.S. Cl. ........................ 526/68; 526/70; 526/901; 422/132; 422/135; 422/138; 422/140; 422/146
(58) Field of Search ........................ 526/68, 70, 901; 422/132, 135, 138, 140, 146

(56) References Cited

U.S. PATENT DOCUMENTS

| | | | |
|---|---|---|---|
| 3,625,932 | 12/1971 | Green | 260/92.8 |
| 3,639,377 | 2/1972 | Trieschmann et al. | 250/93.7 |
| 4,012,573 | 3/1977 | Trieschmann et al. | 526/68 |
| 4,287,327 | 9/1981 | Michaels et al. | 526/86 |
| 4,390,669 | 6/1983 | Morita et al. | 526/65 |
| 4,543,399 | 9/1985 | Jenkins, III et al. | 526/70 |
| 4,588,790 | 5/1986 | Jenkins, III et al. | 526/70 |
| 4,640,963 | 2/1987 | Kreider et al. | 526/67 |
| 4,877,587 | 10/1989 | Rhee et al. | 422/135 |
| 4,933,149 | 6/1990 | Rhee et al. | 422/131 |
| 5,317,036 | 5/1994 | Brady, III et al. | 523/223 |
| 5,352,749 | 10/1994 | DeChellis et al. | 526/68 |
| 5,405,922 | 4/1995 | DeChellis et al. | 526/68 |
| 5,436,304 | 7/1995 | Griffin et al. | 526/68 |
| 5,462,999 | 10/1995 | Griffin et al. | 526/68 |
| 5,541,270 | 7/1996 | Chinh et al. | 526/68 |
| 5,668,228 | 9/1997 | Chinh et al. | 526/67 |
| 5,733,510 | 3/1998 | Chinh et al. | 422/143 |
| 6,139,805 | * 10/2000 | Nagato et al. | 422/143 |

FOREIGN PATENT DOCUMENTS

| | | |
|---|---|---|
| 0040992 | 12/1981 | (EP) . |
| 0088638A2 | 9/1983 | (EP) . |
| 0089691 | 9/1983 | (EP) . |
| 0173261 | 3/1986 | (EP) . |
| 0260154 | 3/1988 | (EP) . |
| 0301872 | 2/1989 | (EP) . |
| 0824114A1 | 2/1998 | (EP) . |
| 0824115A1 | 2/1998 | (EP) . |
| 0824116A1 | 2/1998 | (EP) . |
| 0824117A1 | 2/1998 | (EP) . |
| 0824118A1 | 2/1998 | (EP) . |
| 0825204A1 | 2/1998 | (EP) . |
| 1487845 | 5/1967 | (FR) . |
| 2215802 | 8/1974 | (FR) . |
| 1110566 | 4/1968 | (GB) . |
| 1398965 | 6/1975 | (GB) . |
| 1415442 | 11/1975 | (GB) . |
| WO96 20780 | 7/1996 | (WO) . |
| WO97 18888 | 5/1997 | (WO) . |
| WO97 25355 | 7/1997 | (WO) . |
| WO98 18548 | 5/1998 | (WO) . |

OTHER PUBLICATIONS

Perry et al., Chemical Engineering Handbook, 4th Edition (1973) Section 20, p. 52.

Invention Notice of S. Beret found in Abandoned U.S. Pat. No. 361,547, change of Inventorship submission to USPTO dated Sep. 9, 1982.

* cited by examiner

*Primary Examiner*—Donald R. Wilson
*Assistant Examiner*—R. Rabago
(74) *Attorney, Agent, or Firm*—R. C. Brown; P. W. Leuzzi

(57) ABSTRACT

A process for the manufacture of olefin polymers in a continuous gas phase polymerization reaction wherein monomer, after passage through the fluidized bed, is cooled to a temperature below its dew point to produce a mixture of cold gas and liquid. All or nearly all of the cold gas is introduced into the bottom of the reactor to serve as the fluidizing gas stream for the fluidized bed. Cold liquid, separated from the mixture, is either injected directly into the peripheral region around the fluidized bed or onto the walls of the expanded section of the reactor to form a liquid film flowing down the wall of the reactor or alternatively, the cold liquid is warmed to form a heated fluid by passing in indirect heat exchange relation with the fluidized bed and is then injected directly into the peripheral region of the fluidized bed or onto the wall of the expanded section of the reactor to form a downward flowing stream of cold liquid.

32 Claims, 3 Drawing Sheets

GAS PHASE POLYMERIZATION PROCESS

FIELD OF THE INVENTION

The present invention relates to a continuous process for the gas-phase polymerization of monomers in a fluidized bed or in a stirred bed reactor, and in particular to a process having improved levels of productivity.

Gas phase processes for the homo-polymerization and co-polimerization of monomers, especially olefin monomers are well known in the art. Such processes can be conducted for example by introducing the gaseous monomer into a stirred and/or fluidized bed comprising pre-formed resin particles and a catalyst for the polymerization.

In the gas fluidized bed polymerization of olefins, the polymerization is conducted in a fluidized bed reactor wherein a bed of polymer particles are maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone which contributes to fluidization of the bed. The start-up of such a polymerization process generally employs a bed of pre-formed polymer particles similar to the polymer which it is desired to manufacture. During the course of polymerization, fresh polymer is generated by the catalytic polymerization of the monomer, and polymer product is withdrawn to maintain the bed at more or less constant volume. An industrially favored process employs a fluidization grid to distribute the fluidizing gas to the bed, and also to act as a support for the bed when the supply of gas is cut off. The polymer produced is generally withdrawn from the reactor via a discharge conduit arranged in the lower portion of the reactor, near the fluidization grid. The fluidized bed comprises a bed of growing polymer particles, polymer product particles and catalyst particles. This reaction mixture is maintained in a fluidized condition by the continuous upward flow from the base of the reactor of a fluidizing gas which comprises recycle gas drawn from the top of the reactor, together with added make-up monomer.

The fluidizing gas enters the bottom of the reactor and is passed, preferably through a fluidization grid, upwardly through the fluidized bed.

The polymerization of olefins is an exothermic reaction and it is therefore necessary to provide means for cooling the bed to remove the heat of polymerization. In the absence of such cooling the bed would increase in temperature until, for example, the catalyst became inactive or the bed commenced to fuse.

In the fluidized bed polymerization of olefins, the preferred method for removing the heat of polymerization, is by passing a cooling gas, preferably the fluidizing gas, which is at a temperature lower than the desired polymerization temperature, through the fluidized bed to conduct away the heat of polymerization. The gas is removed from the reactor, cooled by passage through an external heat exchanger and then recycled to the bed.

The temperature of the recycle gas can be adjusted in the heat exchanger to maintain the fluidized bed at the desired polymerization temperature. In this method of polymerizing alpha olefins, the recycle gas generally comprises one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

It is well known that the production rate (i.e. the space time yield in terms of weight of polymer produced per unit volume of reactor space per unit of time) in commercial gas fluidized bed reactors of the above mentioned type, is limited by the maximum rate at which heat can be removed from the reactor. The rate of heat removal can be increased for example, by increasing the velocity of the recycle gas and/or reducing the temperature of the recycle gas. However, there is a limit to the velocity of the recycle gas which can be used. Above this limit the bed can become unstable or even lift out of the reactor into the gas stream, leading to blockage of the recycle line and damage to the recycle gas compressor or blower. Even at velocities below this level, it is important to keep the velocity of the exiting gases safely below the level at which excessive amounts of polymer fines are carried out of the top of the reactor. There is also a practical limit on the extent to which the recycle gas can be cooled. This is primarily determined by economic considerations and is normally determined by the temperature of the industrial cooling water available on site. Refrigeration can be employed if desired, but this adds to the production costs. Thus, in commercial practice, the use of cooled recycle gas as the sole means of removing the heat of polymerization from the gas fluidized bed polymerization of olefins has the disadvantage of limiting the maximum production rates obtainable.

BACKGROUND OF THE INVENTION

The prior art discloses a number of methods for removing heat from gas fluidized bed polymerization processes.

GB 1415442 relates to the gas phase polymerization of vinyl chloride in a stirred or fluidized bed reactor, the polymerization being carried out in the presence of at least one gaseous diluent having a boiling point below that of vinyl chloride. Example 1 of this reference describes the control of the temperature of polymerization by the intermittent addition of liquid vinyl chloride to fluidized polyvinyl chloride material. The liquid vinyl chloride evaporates immediately in the bed, resulting in the removal of the heat of polymerization.

U.S. Pat. No. 3,625,932 describes a process for polymerization of vinyl chloride wherein beds of polyvinyl chloride particles within a multiple stage fluidized bed reactor are kept fluidized by the introduction of gaseous vinyl chloride monomer at the bottom of the reactor. Cooling of each of the beds to remove heat of polymerization generated therein is provided by spraying liquid vinyl chloride monomer into the ascending gas stream beneath the trays on which the beds are fluidized.

GB 1398965 discloses the fluidized bed polymerization of ethylenically unsaturated monomers, especially vinyl chloride, wherein thermal control of the polymerization is effected by injecting liquid monomer into the bed using one or more spray nozzles situated at a height between 0% and 75% of that of the fluidized material in the reactor.

U.S. Pat. No. 4,390,669 relates to homo- or co-polimerization of olefins by a multi-step gas phase process which can be carried out in stirred bed reactors, fluidized bed reactors, stirred fluidized bed reactors or tubular reactors. In this process polymer obtained from a first polymerization zone is suspended in an intermediate zone in an easily volatilized liquid hydrocarbon. The suspension, so obtained, is fed to a second polymerization zone where the liquid hydrocarbon evaporates. In Examples 1 to 5, gas from the second polymerization zone is conveyed through a cooler (heat exchanger) wherein some of the liquid hydrocarbon condenses (with co-monomer if this is employed). The volatile liquid condensate is partly sent in the liquid state to the polymerization vessel where it is vaporized and serves to remove some the heat of polymerization. This reference is ambiguous as to how or where the liquid is introduced into the polymerization vessel.

U.S. Pat. No. 4,543,399 relates to a process for increasing the space time yield in continuous gas fluidized bed processes for the polymerization of fluid monomers, the process comprising cooling part or all of the unreacted fluids to form a two phase mixture of gas and entrained liquid below the dew point and reintroducing said two phase mixture into the reactor. This technique is referred to as operation in the "condensing mode". U.S. Pat. No. 4,543,399 also discloses that it is possible to form a two-phase fluid stream within the reactor at the point of injection by separately injecting gas and liquid under conditions which will produce a two phase stream.

U.S. Pat. No. 5,541,270 discloses a process in which the recycle gas stream is cooled to a temperature sufficient to form a mixture of liquid and gas. The liquid is separated from the gas and is then preferably fed directly into the fluidized bed using a plurality of injection means equally spaced in the fluidized bed in the region of the introduction of liquid. In the disclosed process the number of injection means employed is that which is required to achieve good penetration and dispersion of liquid across the bed. The preferred location of injection means is in the lower part of the region of the fluidized bed at which the recycle gaseous stream has substantially reached the temperature of the gaseous stream being withdrawn from the reactor.

BRIEF SUMMARY OF THE INVENTION

It has now been found that whenever it is desired to introduce liquid into the bed of a fluidized bed reactor, as for example when separately introducing a stream of condensed liquid in a process such as that described in U.S. Pat. No. 5,541,270, referenced above or in accordance with the process disclosed in copending U.S. patent application Ser. No. 09/240,037, filed Jan. 29, 1999, such introduction can be effected smoothly and with less likelihood of reactor upset, if the liquid is introduced peripherally into the reactor in the upper region of the reactor proximate to the fluidized bed. By the use of this invention, a high level of cooling can be achieved without the risk of flooding or wet quenching of the fluidized bed. The risk of internal reactor fouling by sheeting, agglomeration and by other causes is also reduced by the practice of this invention. U.S. Pat. No. 5,541,270, and copending U.S. patent application Ser. No. 09/240,037, are incorporated herein by reference, in their entirety.

Thus according to the present invention there is provided a continuous gas-phase fluidized bed process for the polymerization of monomers, especially olefin monomers, such as ethylene, propylene, butene, mixtures of ethylene and propylene and mixtures of such monomers with one or more other alpha-olefins, such as hexene-1, octene-1 or 4-methylpentene-1, for example, in a fluidized bed reactor. This invention is also useful in other polymerization processes, such as the process described in U.S. Pat. No. 5,453,471.

The objectives of this invention are achieved by continuously recycling a gaseous stream comprising at least some monomer, such as ethylene and/or propylene, through a fluidized bed in a gas fluidized bed or stirred bed reactor in the presence of a polymerization catalyst under reactive conditions. At least a portion of the gaseous stream is withdrawn from reactor and cooled to a temperature at which liquid condenses out. At least a part of the condensed liquid is separated from the gaseous stream and introduced into the reactor directly or after first having been passed in indirect heat exchange relation to the fluidized bed, for example by passing through a plurality of conduits such as metal conduits which have good heat exchange properties and which are in heat exchange contact with at least a portion of the exterior wall of the reactor.

In the normal operation of a fluidized bed reactor, the flow of fluidizing gas is primarily upward through the center or core area of the bed. This flow of gas is characterized by the formation of large bubbles which rise to the top of the fluidized bed, causing considerable turbulence within the bed during the course of passage. A substantial back flow of polymer particles starting at or near the top of the fluidized bed flows down in the vicinity of the wall of the reactor to the lower regions of the bed where they are swept into the upwardly flowing gases in the core region of the fluidized bed. It is this phenomena which accounts for the excellent continuous mixing of monomer gases and polymer particles in gas phase fluidized bed polymerization reactions.

In accordance with this invention, liquid is introduced into the upper peripheral region of the reactor surrounding the fluidized bed in the area where the predominant flow of polymer particles is downward, along the wall of the reactor. This method is to be contrasted with prior art methods of introducing liquid which are focused upon introducing liquid into the central region of the fluidized bed where the predominant flow of gas and polymer particles is upward. This method requires the use of nozzles positioned either in the central core of the fluidized bed or protruding from the wall of the reactor a sufficient distance to insure penetration of the injected liquid stream into the central core region of the fluidized bed. The presence of nozzles in the core region of the fluidizing bed or protruding from the wall of the reactor disturbs the smooth passage of polymer particles and gas within the fluidized bed, causing undesirable turbulence and exposure to serious risk of fouling due to the creation of dead spots in the vicinity of the nozzles or other injection means.

A secondary advantage of this invention results from the localized cooling of the reactor wall due to the peripheral introduction of cold liquid because polymer particles have a reduced tendency to adhere to these colder reactor walls.

While the invention and its advantages are described below in relation to a process conducted in a gas fluidized bed reactor, the invention is equally useful and advantageous when practiced in a stirred bed reactor.

DETAILED DESCRIPTION OF THE INVENTION

Figure 1:
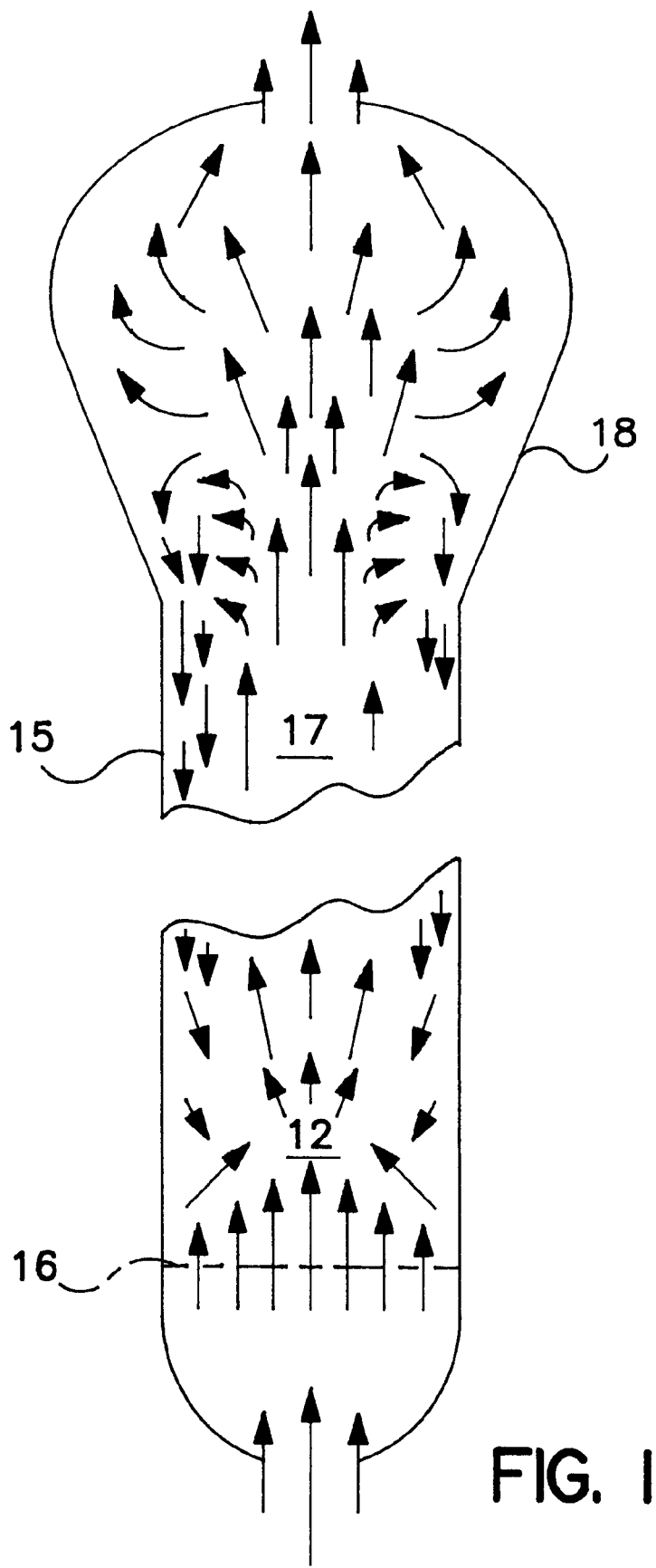
FIG. 1 illustrates the flow of fluidized polymer particles and gases in and through the fluidized bed in a typical fluidized bed reactor.

The process according to the present invention is suitable for the manufacture of polyolefins in the gas phase by the polymerization of one or more olefins at least one of which is preferably ethylene or propylene. Preferred alpha-olefins for use in mixtures with ethylene in the practice of the process of the present invention are those having from 3 to 8 carbon atoms. However, small quantities of alpha olefins having more than 8 carbon atoms, for example olefinic monomers having 9 to 18 carbon atoms, such as ethylidene norbornene can be employed if desired. Thus it is possible to produce homopolymers of both ethylene and propylene as well as copolymers of both ethylene and propylene with one or more higher alpha olefin monomers of which $C_3$–$C_8$ alpha olefins are preferred. Among the preferred higher alpha-olefins are butene-1, pentene-1, hexene-1, 4-methylpentene-1, octene-1 and butadiene. Examples of higher olefins that can be copolymerized with the primary ethylene or propylene monomer, or as partial replacement for the $C_3$–$C_8$ monomer are decene-1 and ethylidene norbornene.

When the process is used for the co-polimerization of ethylene or propylene with alpha-olefins, ethylene or propylene is present as the major component of the copolymer, and preferably is present in an amount which is at least 70% of the total quantity of monomer entering the fluidized bed.

The process according to the present invention may be used to prepare a wide variety of polymer products, such as linear low density polyethylene (LLDPE) based on copolymers of ethylene with butene-1, 4-methylpentene-1 or hexene-1 The process can also be used to produce high density polyethylene (HDPE) which can be for example, homo-polyethlene or copolymers of ethylene with a small portion of a higher alpha olefin, such as butene-1, pentene-1, hexene-1, 4-methylpentene-1 or octene-1.

The liquid which condenses out of the recycle gaseous stream can be a condensable monomer, e.g. butene, hexene, or octene when used as a co-monomer for the production of LLDPE or it may be an inert condensable liquid, e.g. butane, pentane, or hexane.

It is desirable that nearly all of any free liquid entering bed should vaporize within the bed under the polymerization conditions being employed so that the maximum cooling effect is obtained while avoiding any substantial accumulation of liquid within the bed. Preferably, except when producing polymers by the process disclosed in U.S. Pat. No. 5,453,471, all of the liquid entering the bed evaporates therein. In the case of liquid comonomers, some of the comonomer polymerizes in the bed, and such polymerization takes place with reactants which are either in the liquid or the gas phase. As is well known in conventional gas phase polymerization and co-polimerization processes, a small proportion of the monomer (and comonomer, if any is used) tends to remain associated (absorbed or dissolved) in the product polymer until the polymer has been removed from the reactor and is subjected to degassing. Such associated quantities and even higher quantities of absorbed or dissolved monomers and comonomers can readily be tolerated within the bed provided that these quantities do not adversely affect the fluidization characteristics of the bed.

The use and advantages of this invention are not restricted to its use with any particular catalyst or family of polymerization catalysts. The invention is useful in any exothermic polymerization reaction employing any catalyst whether it is supported or unsupported and regardless of whether it is in the form of a pre-polymerized catalyst.

The process is particularly suitable for polymerizing olefins at a pressure of between 0.5 and 6 MPa and at a temperature of between 30° C. and 130° C. For example for LLDPE production the temperature is suitably in the range 80–90° C. and for HDPE the temperature is typically 85–105° C. depending on the activity of the catalyst used. It is important to ensure that the temperature within the fluidized bed be maintained at a level which is safely below the sintering temperature of the polymer product being produced.

The polymerization reaction may be carried out in the presence of a metallocene catalyst system or a catalyst system of the of the Ziegler-Natta type. Ziegler-Natta catalyst systems are solid catalyst systems comprised of a compound of a transition metal employed with a cocatalyst comprising an organic compound of a metal (i.e. an organometallic compound, for example an alkylaluminium compound or a haloalkyl aluminum compound such as diethylchloroaluminum). Such high-activity catalyst systems have been known for many years and are capable of producing large quantities of polymer in a relatively short time. They also make it possible to avoid a step of removing catalyst residues from the polymer. The most commonly used high-activity catalyst systems generally comprise a solid catalyst consisting essentially of atoms of transition metal associated with magnesium and halogen. Also used are transitional metal catalysts and metallocene catalyst supported on finely divided silica. It is also possible to use a high-activity catalyst consisting essentially of chromium oxide supported on a refractory oxide.

It is an advantage of the process according to the present invention that the improved cooling effect is particularly beneficial for polymerization processes using highly active catalysts, for example metallocene catalysts.

The catalyst may suitably be employed in the form of a prepolymer powder prepared beforehand during a prepolymerization stage with the aid of a catalyst as described above. The prepolymerization may be carried out by any suitable process, for example, polymerization in a liquid hydrocarbon diluent or in the gas phase using a batch process, a semi-continuous process or a continuous process.

The preferred process according to the present invention is one wherein substantially the whole of the recycle gas stream is cooled and separated and wherein substantially the whole of the separated liquid is employed for cooling the fluidized bed either directly as disclosed in U.S. Pat. No. 5,541,270 or indirectly through the reactor wall as described in copending U.S. patent application Ser. No. 09/240,037, filed Jan. 29, 1999.

The recycle gaseous stream is suitably cooled by means of one or more heat exchangers to a temperature such that liquid is condensed in the gas stream. Suitable heat exchangers are well known in the art.

The gas stream leaving the top of the reactor may entrain a quantity of catalyst and polymer particles and these may be removed, if desired, from the recycle gas stream by means of a cyclone separator. A small proportion of these particles or fines may remain entrained in the recycle gaseous stream and, after cooling and separating the liquid from the gas, the fines can, if desired, be reintroduced into the fluidized bed together with the separated liquid stream.

The recycle gas stream withdrawn from the reactor is comprised primarily of unreacted gaseous monomer and may also include inert hydrocarbons such as those used for the injection of catalyst, reaction activators or moderators into the reactor. The withdrawn recycle stream will also include inert condensable gases, such as isopentane, decane or the like when such inert materials are employed to facilitate reactor cooling according to the invention.

Make-up monomers, for example ethylene, to replace monomers converted into polymer by the polymerization reaction, may be added to the recycle gas stream at any suitable location. Condensable make-up monomers, for example, butene, hexene, 4-methylpentene and octene, when used as comonomers for the production of LLDPE, and inert condensable liquids, for example, pentane, isopentane, butane and hexane, if employed, may be introduced into the recycle stream as liquids or as gases.

Inert condensable liquids, for example, pentane may, for example, be injected into the recycle gaseous stream before passage into the heat exchanger, between the heat exchanger and the separator or elsewhere such as into the separated gas stream prior to its entry into the reactor. The particular point of entry of such liquids is not important for the achievement of the benefits of this invention. The same is true with regard to the introduction of make-up monomer into the reactor or the cycle stream. For the preparation of LLDPE, for example, butene, the usual comonomer, is preferably injected into the recycle gaseous stream prior to its passage into the reactor or before passage into a heat exchanger used to cool the cycle gas stream.

Suitable means for separating the liquid are for example cyclone separators, large vessels which reduce the velocity of the gas stream to effect separation (knock-out drums), demister type gas liquid separators and centrifugal separators. Such separators are well known in the art and are available from a number of commercial suppliers. The use of a demister type of gas-liquid separator is particularly advantageous in the process of the present invention.

The use of a cyclone separator in the recycle gas stream prior to the gas-liquid separator is optional in circumstances where large amounts of fines are carried out of recycle stream leaving the top of the reactor. A cyclone separator at this location will remove the majority of the fines from the gaseous stream leaving the reactor and can thereby facilitate the use of a downstream demister separator by reducing the possibility of fouling the separator.

A further advantage of using a demister type of separator is that the pressure drop within the separator can be lower than in other types of separators thereby enhancing the efficiency of the overall process.

One suitable demister separator for use in the process of the present invention is a commercially available vertical gas separator known as a "Peerless" (Type DPV P8X). This type of separator uses the coalescence of liquid droplets on a vane arrangement to separate the liquid from the gas. A large liquid reservoir is provided in the bottom of the separator for collection of the liquid. The liquid reservoir enables the liquid to be stored thereby providing control over the discharge of the liquid from the separator. Under normal conditions this type of separator removes on the order of 80% to 85% of condensed liquid from the gas stream. If desired, a filter mesh, or other suitable means, may be arranged in the liquid reservoir of the separator to collect any fines present in the separated liquid.

After separation, all or a portion of the separated cold liquid is suitably introduced directly into the fluidized bed or brought into indirect heat exchange relationship with the fluidized bed through the exterior wall of the reactor. By this means heat is removed from the fluidized bed thereby increasing the space time yield of the process. When the cold liquid is brought into indirect heat exchange relation with the bed, it removes heat from the interior of the reactor, especially the reaction zone and by so doing becomes a heated fluid. Depending upon the amount of heating experienced by the cold liquid, this now heated fluid will be all gas, a mixture of gas and liquid or will remain entirely liquid, but at a somewhat warmer temperature. This heated fluid may then be introduced into the reactor or elsewhere in the reaction system at whatever point is desired. When the heated fluid remains liquid after indirect heat exchange passage, a preferred method of achieving further cooling is to introduce the liquid directly into the fluidized bed of the reactor.

In both instances, when it is desired to introduce the cold liquid into the reactor, whether immediately after separation or after indirect heat exchange passage, it is important that the liquid be introduced into the bed in a way that minimizes the creation of hot spots or other anomalies in the fluidized bed that can lead to non-uniformity of the gas composition or increases in the likelihood of fouling.

In accordance with this invention, the cold liquid is introduced peripherally into the reactor in the upper vicinity of the fluidized bed at a location where the primary flow of fluidizing gas is downward. Nozzles of any kind may be used for this purpose. They may be simple injector nozzles, spray nozzles, gas assisted nozzles or ultrasonic nozzles. The preferred devices are those which least protrude into the interior of the reactor. It is also preferred that the injection device be shielded so as to streamline the flow of gas around the device to minimize the formation of hot spots and fouling of the interior of the reactor. It is also preferred to provide some means such as a gas injector, so as to be able to clear the nozzle or jet opening in the event of plugging to avoid the necessity of reactor shutdown, if plugging should occur.

It will normally be necessary to pressurize the cold liquid stream to allow its introduction into the reactor. In the preferred operation of the process of this invention the pressure of the entering cold liquid is adjusted to achieve whatever rate of cold liquid introduction is desired but kept below a level at which a significant amount of cold liquid penetrates into the core region of the fluidized bed where the primary flow of gas is upward. Subject to this constraint the entering cold liquid pressure is preferably kept at a level which minimizes the possibility of plugging.

In an alternative embodiment of the invention, the cold liquid is introduced into the reactor under minimal pressure so that there is essentially no liquid spray entering the gas stream but instead a thin curtain or film of liquid is formed which flows down the wall of the reactor. When this embodiment of the invention is employed, the film forming liquid is preferably introduced into an upper region of the reactor so that the cold liquid is either vaporized or fully entrained in the downward flow of fluidizing gas before reaching the turbulent or chaotic region which exists at the fluidized bed. A preferred location for creating a film of the cold liquid is in the expanded or low pressure region of the reactor, where due to the lower pressure existing in that location, liquid will flow downward into the vicinity of the fluidized bed there to encounter the downward flowing fluidized polymer particles.

This embodiment has the advantage of reducing the occurrence of fouling which sometimes occurs in the expanded section of the reactor. This is thought to be the result of hot polymer particles being less likely to adhere to cold surfaces, especially a cold liquid surface. When this embodiment is practiced, it preferred to keep the level at which the film is formed in the expanded section safely below the level at which liquid might be entrained in the exiting cycle gas.

A further benefit is obtained because liquid entering the reactor in accordance with this invention is afforded a longer flow path by traveling down through the peripheral region and then up the central core region of the reactor. In circumstances where very large volumes of liquid are introduced, this longer flow path increases the possibility that the liquid will be vaporized and lessens the possibility that liquid will accumulate in the bottom of the reactor, where flooding, leading to eventual shut-down of the reactor can occur.

A liquid film or curtain of cold liquid can easily be formed through the use of nozzles directing a fine spray of liquid onto the interior surface of the reactor wall. Liquid may also be transferred directly onto the interior reactor wall by the use of an interior manifold or by passage through tangentially directed ports in the wall of the reactor.

In accordance with the invention, gas from the separator is recycled to the fluidized bed, normally by introduction into the bottom of the reactor. If a fluidization grid is employed, such recycle is normally to the region below the grid, as the grid facilitates uniform distribution of the gas which serves to fluidize the bed. The use of a fluidization grid is preferred for this reason. Fluidization grids suitable for use in the process of the present invention can be of conventional design, for example, a flat or dished plate perforated by a plurality of holes distributed more or less uniformly across its surface. The holes may for example be of a diameter of about 5 mm.

The process of the present invention is operated with a gas velocity in the fluidized bed which must be greater than or equal to that required for fluidization of the bed. The minimum gas velocity is generally on the order of 6 cm/sec. The process of the present invention is preferably conducted using a gas velocity in the range 40 to 100 cm/sec, most preferably 50 to 70 cm/sec.

In the process according to the present invention the catalyst or prepolymer is preferably introduced directly into the fluidized bed. Alternatively, catalyst may be introduced directly into the bed using a portion of the separated liquid stream. This latter technique can lead to improved dispersion of the catalyst or prepolymer in the bed.

If desired, liquid or liquid-soluble additives, such as activators, cocatalysts and the like, can be introduced into the bed either directly or together with cold condensed liquid from the separator.

If, for example, the process of the present invention is employed to make ethylene homopolymer or ethylene copolymer, make-up ethylene to replace the ethylene consumed during the polymerization, may be advantageously introduced into the separated gas stream prior to its reintroduction into the bed (for example below the fluidization grid if such is employed).

The separated liquid stream may be subjected to additional cooling (e.g. using refrigeration techniques) before being introduced into the heat exchange conduits or prior to direct introduction into the bed. This allows an even greater cooling effect in the bed than is provided by the liquid evaporative effect alone (latent heat of evaporation), thereby providing a further potential increase in the productivity of the process. Cooling of the separated liquid stream may be achieved by use of suitable cooling means e.g. a simple heat exchanger or refrigerator located between the separator and the manifold or between the second manifold and the entry point into the reactor. A further advantage of this particular aspect of the present invention is that, cooling the liquid prior to its introduction into the fluidized bed, reduces the likelihood for polymerization to begin to take place before entry into the reactor due to the possible presence of catalyst or prepolymer in the liquid stream.

The rate and amount of liquid to be introduced into the bed, whether directly or indirectly with the entering gas stream depends primarily on the degree of cooling desired in the bed, and this in turn depends on the desired rate of production from the bed. The rates of production obtainable from commercial fluidized bed polymerization processes for the polymerization of olefins depend, inter alia on the activity of the catalyst employed, rate of catalyst addition and on the kinetics of such catalysts. Thus for example, when catalysts having very high activity are employed, and high production rates are desired, the rate and amount of liquid addition will be high. Typical rates of liquid introduction may be, for example, in the range 0.3 to 4.9 cubic meters of liquid per cubic meter of bed material per hour, or even higher. For conventional Ziegler catalysts of the "superactive" type (i.e. those based on transition metal, magnesium halide and organometallic cocatalyst, the rate of liquid addition may be, for example, in the range 0.5 to 1.5 cubic meters of liquid per cubic meter of bed material per hour.

Figure 2:
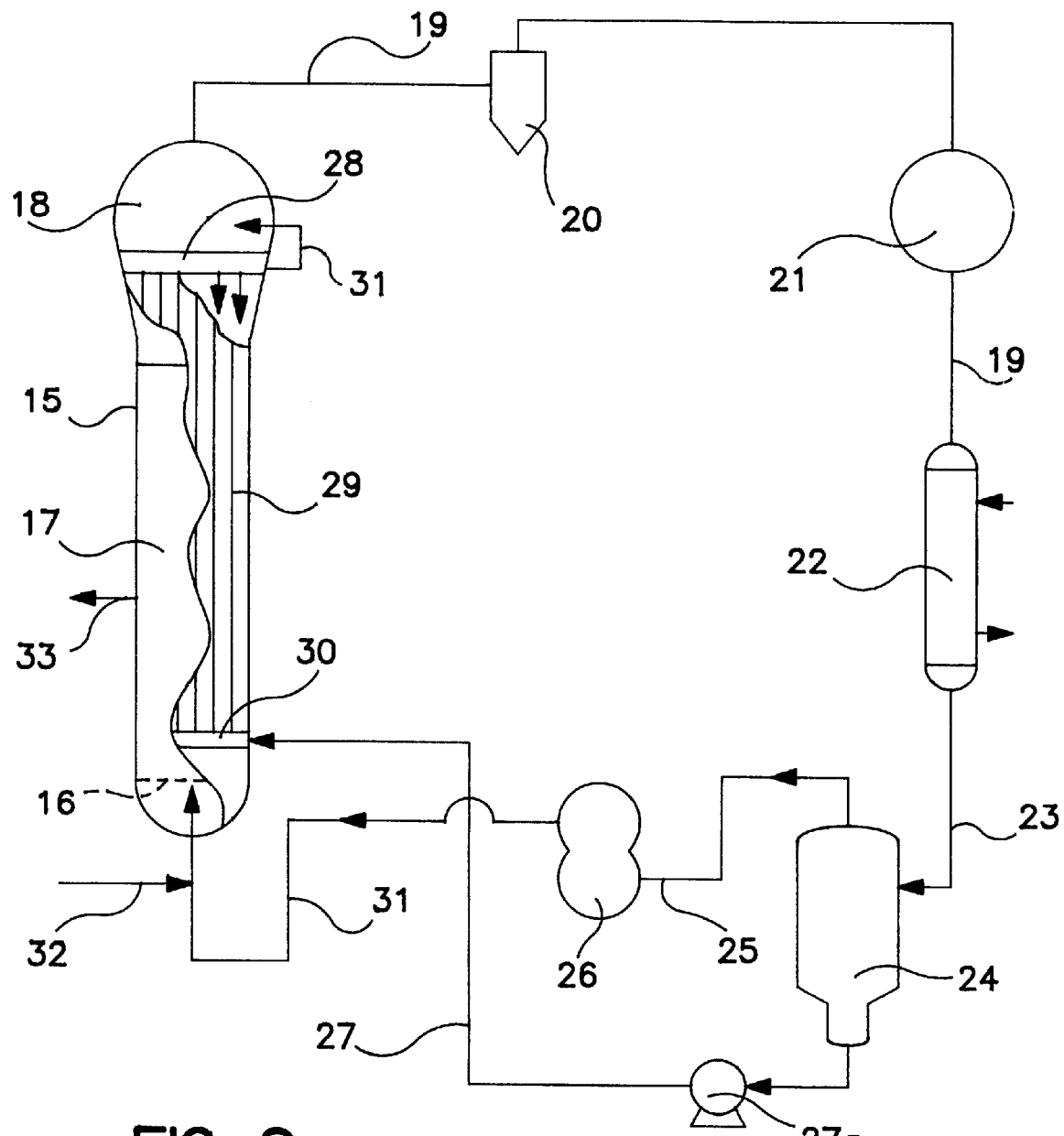
FIG. 2 shows, diagrammatically, a gas-phase fluidized bed polymerization process according to the invention.

In the process of the present invention the weight ratio of liquid to total gas which may be introduced into the bed, can be for example, in the range 1:100 to 2:1, preferably in the range 5:100 to 85:100, and most preferably in the range 6:100 to 25:100. By total gas is meant the gas which is returned to the reactor to fluidize the bed together with any gas used to assist in the operation of the injection means, e.g. atomizing gas. However the total liquid in respect of these ratio determinations does not include any quantity of liquid which becomes vaporized by the transfer of heat through the reactor wall during passage through the heat exchange conduits when the indirect heating embodiment of the invention as illustrated in FIG. 2 is practiced. The ability to employ this significantly greater amount of cold liquid to remove heat from the fluidized bed is a principal advantage of this invention.

Before commencing the introduction of liquid by use of the process according to the present invention, the gas phase fluidized bed polymerization may be started in a conventional manner for example by charging the bed with particulate polymer particles and then initiating the gas flow through the bed.

Processes according to the present invention will now be illustrated with reference to the accompanying drawings.

Figure 3:
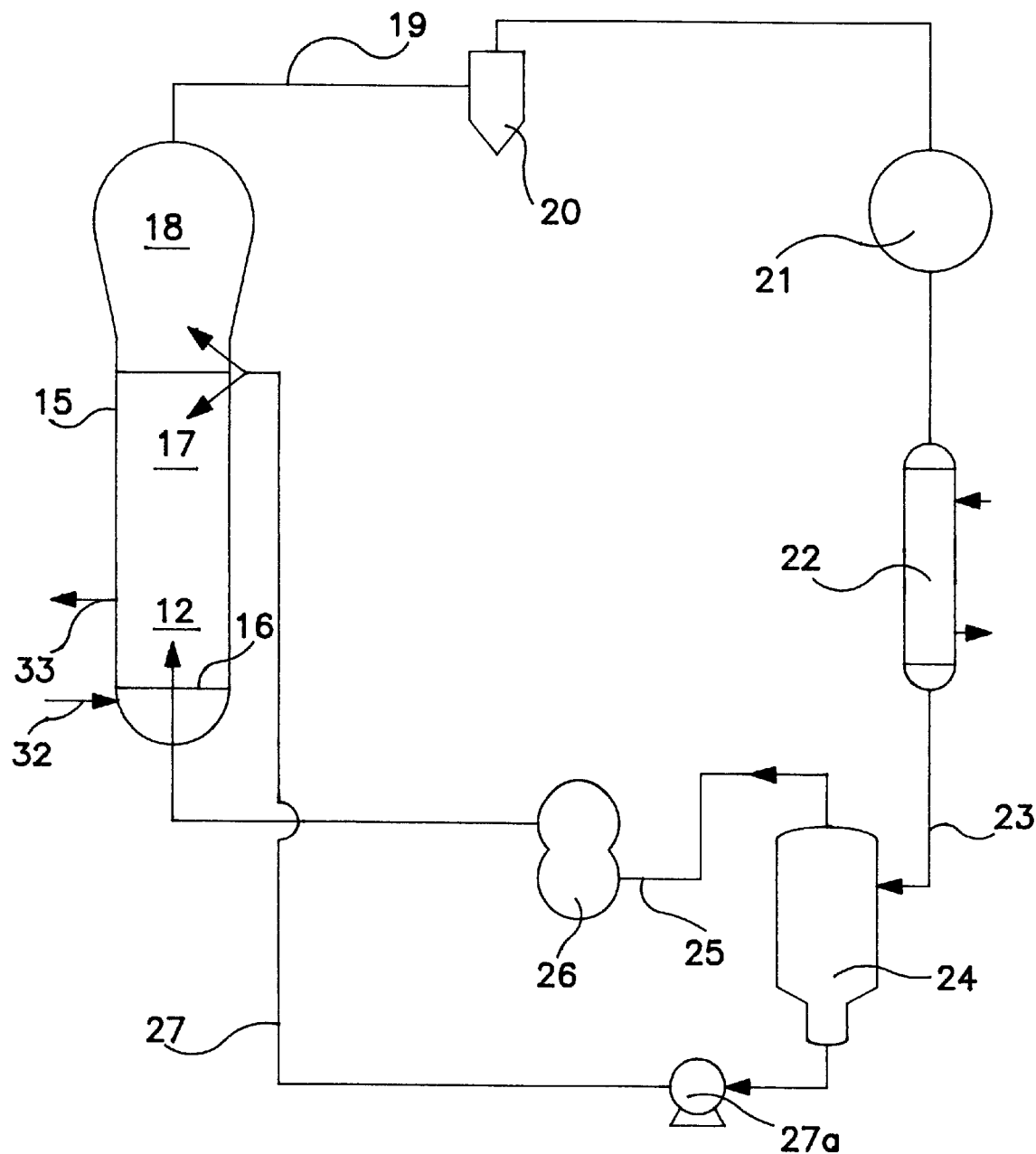
FIG. 3 shows, diagrammatically, an alternative arrangement for the practice of the invention.

FIG. 1 illustrates the flow of gases and fluidized polymer particles in a typical fluidized bed reactor. FIGS. 2 and 3 diagrammatically show processes according to this invention.

FIG. 1 illustrates the flow of polymer particles and gases in a gas-phase fluidized bed reactor consisting essentially of a reactor body 15 which is generally an upright cylinder having a fluidization grid 16 located in its lower regions. The reactor body encloses a fluidized bed 17 and a velocity reduction zone 18 which is generally of increased diameter compared to the diameter of the fluidized bed portion of the reactor. Cycle gases enter at the bottom of the reactor and exit from the top of the reactor, as shown. The region 12 immediately above grid 16 is a chaotic region characterized by a high degree of turbulence.

The primary flow of cycle gases, after emerging from the chaotic region, is upward through the central core region of the fluidized bed. The upward flow of gases is characterized by the passage of large bubbles of gas moving up through the polymer particles formed in the bed. The upward passage of these large bubbles causes polymer particles in the peripheral region to be drawn down to fill the spaces vacated by the upward passage of bubbles. The primary upward flow of cycle gases is indicated by the upwardly pointing arrows in the drawing. The opposite downward flow of fluidized particles which takes place in the peripheral regions of the fluidized bed is shown by the arrows pointing downward in the drawing. The downward flowing polymer particles continue their downward passage until they encounter upwardly flowing cycle gases in the lower regions of the reactor. This confrontation of downward flowing fluidized polymer particles and upwardly flowing cycle gases is one cause of the high level of turbulence in the lower region of the reactor and is one of the explanations for the excellent mixing of gas and polymer particles which is characteristic of fluidized bed reactors. In FIG. 1 it was necessary to illustrate the reactor in segments, due to the great height of typical commercial reactors (100 feet or more) in relation to the diameter of such reactors.

From this illustration it will be seen that the least disruption of the normal flow of cycle gases will occur when liquid is injected into the peripheral region of the reactor, preferably also in the upper region of the fluidized bed. Injection of liquid in this way does not involve the installation of nozzles in the core area of the bed nor does it involve hardware protruding from the wall of the reactor a sufficient distance to ensure injection into the core region, both of which are susceptible to the creation of dead spots which can lead to reactor fouling and eventual shut down. The presence of obstructions of any kind in the core region of the reactor is to be avoided, if possible, due to the likelihood of creating undesirable turbulence which can interfere with uniform mixing of monomer and polymer particles in the fluidized bed.

From the drawing it will be appreciated that liquid can be introduced onto the wall of the reactor in the low pressure region which exists in the expanded section of the reactor. This embodiment of the invention permits liquid to be introduced into the reactor with little or no disruption to the upward flow of exiting cycle gases. This is best accomplished by a plurality of small nozzles or a manifold so as to create a liquid film or curtain of liquid which will flow down the reactor wall until it becomes vaporized or entrained by the downward passage of polymer particles in the peripheral region of the reactor.

By coating the wall of the reactor with cold liquid, especially in the expanded section, an added benefit of the invention is a reduction in the potential for the formation of polymer sheets or other agglomerations on or in the vicinity of the reactor wall. This is because hot polymer particles are less likely to adhere to a cold surface, especially if liquid is present. This benefit also obtains as a result of the cooling of the reactor wall when cold liquid is injected into the peripheral region without necessarily coming into direct contact with the reactor wall.

Referring now to FIG. 2, the gaseous reaction mixture leaving the top of the fluidized bed reactor is the recycle gas stream which is primarily comprised of unreacted monomer. The recycle gas stream may also include inert condensable gases such as isopentane, as well as inert non-condensable gases such as nitrogen. The recycle stream is transferred via line 19 to compressor 21 and from compressor 21 to heat exchanger 22. An optional cyclone separator 20 may be employed, as shown, preferably upstream of compressor 21, to remove fines, if necessary. An additional heat exchanger (not shown) may also be employed if desired, preferably upstream of compressor 21.

After compressing and cooling at least a portion of the recycle gas stream to a temperature at or below the temperature where liquid condensate begins to form (the dew point), all or a portion of the resultant gas liquid mixture is transferred via line 23 to separator 24 where all or a portion of the liquid is removed. All or a portion of the gas stream, which may contain some liquid, is transferred via line 25 to a point below the fluidization grid 16 in the lower region of the reactor. An amount of upwardly flowing gas, sufficient to maintain the bed in a fluidized condition, is provided in this way.

Those skilled in the art will understand that less gas is required to maintain fluidization when the reactor employed is a stirred bed reactor.

An optional compressor 26 may be provided to ensure that a sufficient velocity is imparted to the gases flowing through line 25 into the bottom of the reactor, preferably below grid 16 as shown in the drawing. The gas stream entering the bottom of the reactor may contain condensed liquid, if desired.

All or a portion of the liquid monomer separated from the recycle stream in separator 24 is transferred via line 27 to a manifold 30 located at or near the bottom of the reactor. A pump 27a is provided in line 27 to facilitate the transfer of liquid to manifold 30. The liquid entering manifold 30 flows upward into manifold 28 through a plurality of conduits 29 which have good heat exchange properties and which are in heat exchange contact with the wall of the reactor. The passage of liquid monomer through the conduits 29 cools the interior wall of the reactor and warms the liquid to a greater or lesser extent depending upon the temperature differential and the duration and extent of heat exchange contact. Thus by the time the liquid entering manifold 30 reaches manifold 28, it has become a heated fluid which may have remained in an entirely liquid state or it may have become partially or totally vaporized.

Alternatively, liquid monomer may be passed downwardly through a plurality of conduits from an upper region of the reactor to a lower region of the reactor.

In accordance with the present invention, the cold liquid will have been subjected to conditions such that the liquid will remain essentially all liquid albeit warmer than when it entered manifold 30. As shown in FIG. 2, the heated liquid is passed from manifold 28 via line 31 to a point in the upper region of the fluidized bed where it is injected through preferably a plurality of orifices or nozzles into the region of downward fluidized polymer particle flow in the peripheral area surrounding the core of the bed. Alternatively, the heated liquid may be introduced via line 31 or directly from manifold 28 into the expanded section of the reactor in a manner such that a liquid film of heated liquid is formed on the wall of the reactor.

A further alternative is to introduce a part of the heated fluid into the region below the fluidized bed. Or part of the heated fluid may be combined with the cooled gaseous stream prior to its entry into the reactor. A further alternative is to spray a part of the heated liquid onto the top of the fluidized bed. A still further alternative is to combine part of the heated fluid with the gaseous stream leaving the top of the reactor prior to its passage through a heat exchanger.

There is always some risk that nozzles employed to introduce liquid may become plugged due to polymer buildup in the region of the exit orifice. For that reason, a source of pressurized gas may be provided, if desired, to permit gas under pressure to be blown through the nozzles or orifices of whatever kind used to introduce liquid into the reactor. It is also useful to continuously pass gas through the nozzles during times when the flow of liquid through the nozzles is interrupted for any period of time to prevent nozzle plugging. The fluid employed for this purpose may be liquid or gas but is preferably gas. The fluid used for this purpose may be any inert fluid, or may also be monomer, such as ethylene, or a different monomer which is among those being polymerized. The fluid employed for this purpose may be sourced from a pressurized container or may be pressurized by a compressor or pump, not illustrated.

Make-up monomer can be introduced into the reactor in either liquid or gaseous form via line 32.

Product polymer particles can be removed from the reactor via line 33 in the conventional way, as for example by the method and apparatus described in U.S. Pat. No. 4,621,952.

Catalyst or prepolymer catalyst is continuously or intermittently injected into the reactor using a catalyst feeder (not shown) such as the device disclosed in U.S. Pat. No. 3,779,712. The catalyst is preferably fed into the reactor at a point 20 to 40 percent of the reactor diameter away from the reactor wall and at a height of about 5 to about 30 percent of the height of the bed.

A gas which is inert to the catalyst, such as nitrogen or argon is preferably used to carry catalyst into the bed. Cold condensed liquid from either separator 24 or from manifold 28 may also be used to transport catalyst into the bed.

FIG. 3 illustrates an alternative arrangement for conducting the process of this invention in which cold liquid from separator 24 is transferred by pump 27a via line 27 directly into either or both the peripheral region of the reactor surrounding the core of the fluidized bed in the upper region of the fluidized bed or into the expanded region of the reactor, there to form a liquid film on the wall of the reactor.

The processes of this invention can be practiced in either a gas fluidized bed process or in a process conducted in a stirred bed reactor.

The process of the present invention provides substantial improvements in the operation of fluidized bed polymerization processes over existing processes. The process of the present invention can be employed in a new plant or can be employed in an existing plant to obtain good productivity, better control of liquid addition to the bed and reduced problems with reactor fouling. In the case of the installation of new plant, substantial reductions in capital costs can be achieved by using smaller reaction vessels, compressors and other ancillary equipment than might otherwise have been necessary to achieve a particular level of productivity.

We claim:

1. A continuous process for the polymerization of a polymerizable olefin monomer or a mixture of two or more olefinic monomers by passing a gaseous stream comprised of an olefin monomer or a mixture of olefinic monomers through a fluidized bed in a reactor in the presence of a polymerization catalyst under reactive conditions, to polymerize at least a portion of said olefin monomer or said mixture of olefinic monomers, which comprises:
   A. withdrawing a gaseous stream from said reactor which is comprised of at least some unreacted olefin monomer or at least some of said mixture of olefinic monomers,
   B. cooling at least a part of said gaseous stream withdrawn from said reactor to a temperature at or below that at which liquid condenses out of said stream,
   C. separating at least part of the condensed liquid from the cooled gaseous stream,
   D. continuously introducing at least a portion of said cooled gaseous stream into the said reactor, and
   E. injecting at least a part of said condensed liquid into the reactor onto a portion of the wall of the reactor which is above or generally peripheral to the said fluidized bed or into a peripheral region of said fluidized bed where the flow of polymer particles within the bed is primarily downward, toward the bottom of the reactor.

2. A continuous process for the polymerization of a polymerizable olefin monomer or a mixture of two or more olefinic monomers by passing a gaseous stream comprised of an olefin monomer or a mixture of olefinic monomers through a fluidized bed in a reactor in the presence of a polymerization catalyst, under reactive conditions, to polymerize at least a portion of said olefin monomer or said mixture of olefinic monomers, which comprises:
   A. withdrawing a gaseous stream from said reactor which is comprised of at least some unreacted olefin monomer or at least some of said mixture of olefinic monomers,
   B. cooling at least a part of said gaseous stream withdrawn from said reactor to a temperature at or below that at which liquid condenses out of said stream,
   C. separating at least part of the condensed liquid from the cooled gaseous stream,
   D. continuously introducing at least a portion of said cooled gaseous stream into said reactor
   E. bringing at least a part of said condensed liquid into indirect heat exchange relationship with said fluidized bed, thereby to produce a heated fluid, and
   F. injecting at least a part of said condensed liquid into the reactor onto a portion of the wall of the reactor which is above or generally peripheral to the said fluidized bed or into a peripheral region of said fluidized bed where the flow of polymer particles within the bed is primarily downward, toward the bottom of the reactor.

3. A continuous process according to claim 1 wherein said reactor is a gas fluidized bed reactor.

4. A continuous process according to claim 1 wherein said reactor is a stirred bed reactor.

5. A continuous process according to claim 1 wherein said gaseous stream includes an inert condensable gas.

6. A continuous process according to claim 1 wherein said gaseous stream is comprised of ethylene or ethylene and one or more other polymerizable monomers.

7. A continuous process according to claim 1 wherein said gaseous stream is comprised of propylene or propylene and one or more other polymerizable monomers.

8. A continuous process according to claim 1 wherein pump means is provided to pressurize said condensed liquid.

9. A continuous process according to claim 1 wherein said condensed liquid is cooled further after being separated from said cooled gaseous stream.

10. A process for producing polymer from monomer by an exothermic polymerization reaction in a reaction zone containing a bed of gas fluidized growing polymer particles which comprises:
   A. continuously passing a gaseous stream comprising monomer through said reaction zone with an upward velocity sufficient to maintain said particles in a suspended and gas fluidized condition;
   B. intermittently or continuously introducing a polymerization catalyst into said reaction zone;
   C. continuously or intermittently withdrawing polymer product from said reaction zone;
   D. continuously withdrawing a stream comprising unreacted monomer gases from said reaction zone;
   E. compressing and cooling said stream to a temperature below the dew point of said stream to form a mixture comprised of gas and liquid;

F. separating liquid from said mixture;

G. continuously introducing all or a part of the remainder of said mixture, after separation of liquid from said mixture, into the bottom of said reactor in a region below the said reaction zone; and H. injecting at least a part of said condensed liquid into the reactor onto a portion of the wall of the reactor which is above or generally peripheral to the said fluidized bed or into a peripheral region of said fluidized bed where the flow of polymer particles within the bed is primarily downward, toward the bottom of the reactor.

11. A process for producing polymer from monomer by an exothermic polymerization reaction in a reaction zone containing a bed of gas fluidized growing polymer particles which comprises:

A. continuously passing a gaseous stream comprising monomer through said reaction zone with an upward velocity sufficient to maintain said particles in a suspended and gas fluidized condition;

B. intermittently or continuously introducing polymerization catalyst into said reaction zone;

C. continuously or intermittently withdrawing polymer product from said reaction zone;

D. continuously withdrawing a stream comprising unreacted gases from said reaction zone;

E. compressing and cooling said stream to a temperature below the dew point of said stream to form a mixture comprised of cooled gas and cooled liquid;

F. separating cooled liquid from said mixture;

G. continuously introducing all or a part of the remainder of said mixture, after separation of cooled liquid therefrom, into the bottom of said reactor in a region below the said reaction zone;

H. bringing at least a part of said cooled liquid into indirect heat exchange relation with said reaction zone, thereby to produce a heated fluid; and I. injecting at least a part of said condensed liquid into the reactor onto a portion of the wall of the reactor which is above or generally peripheral to the said fluidized bed or into a peripheral region of said fluidized bed where the flow of polymer particles within the bed is primarily downward, toward the bottom of the reactor.

12. A process according to claim 10 wherein said catalyst is a metallocene catalyst.

13. A process according to claim 10 wherein said catalyst is a transition metal containing catalyst.

14. A process according to claim 10 wherein said catalyst is a transition metal containing catalyst or a metallocene catalyst supported on finely divided silica.

15. A process according to claim 10 wherein said catalyst is a catalyst which has been pre-polymerized.

16. A process according to claim 10 wherein said monomer is ethylene alone or ethylene in combination with one or more other olefinic monomers.

17. A process according to claim 10 wherein said monomer is propylene alone or propylene in combination with one or more other olefinic monomers.

18. A process according to claim 10 wherein said monomer is comprised of one or more olefinic monomers in combination with a condensable inert gas.

19. A process according to claim 10 wherein said liquid is injected onto a portion of the wall of the reactor which is located in the low pressure region within the expanded section of the reactor.

20. A process according to claim 10 wherein said cooled liquid is brought into indirect heat exchange relation with said reaction zone by passage through a plurality of conduits passing from an upper region of said reactor to a lower region of said reactor.

21. A process according to claim 20 wherein said upper region of said reactor is a location which is above the level of said fluidized bed.

22. A process according to claim 10 wherein said cooled liquid is brought into indirect heat exchange relation with said reaction zone by passage through a plurality of conduits passing from a lower region of said reactor to an upper region of said reactor.

23. A process according to claim 11 wherein a part of said heated fluid is introduced into the reactor in the region below the fluidized bed.

24. A process according to claim 11 wherein a part of said heated fluid is combined with said cooled gaseous stream prior to the entry of said cooled gaseous stream into the reactor.

25. A process according to claim 11 wherein a part of said heated fluid is sprayed onto the top of said fluidized bed.

26. A process according to claim 11 wherein a part of said heated fluid is combined with said gaseous stream prior to the passage of said gaseous stream through a heat exchanger for the cooling thereof.

27. A process according to claim 10 wherein all or a part of said heated fluid is introduced into the said fluidized bed through nozzle means.

28. A process according to claim 27 wherein said nozzle means is one or more liquid nozzles, spray nozzles, gas assisted atomizing nozzles or ultrasonic nozzles.

29. A continuous process according to claim 1 wherein said condensed liquid is introduced into said reactor as a liquid film flowing down the reactor wall.

30. A continuous process according to claim 11 wherein said heated fluid is introduced into said reactor as a liquid film flowing down the reactor wall.

31. A continuous process according to claim 27 wherein pressurized fluid is passed through the said nozzles to prevent or remove any obstacle to the passage of liquid into said reactor.

32. A continuous process according to claim 31 wherein said fluid is gaseous fluid comprising monomer or an inert gas.

* * * * *